US006246933B1

(12) United States Patent
Bagué

(10) Patent No.: US 6,246,933 B1
(45) Date of Patent: Jun. 12, 2001

(54) TRAFFIC ACCIDENT DATA RECORDER AND TRAFFIC ACCIDENT REPRODUCTION SYSTEM AND METHOD

(76) Inventor: Adolfo Vaeza Bagué, Faicsa S.A., Gral. Pico 239, (1768) Villa Madero, Buenos Aires (AR)

( * ) Notice: Subject to any disclaimer, the term of this patent is extended or adjusted under 35 U.S.C. 154(b) by 0 days.

(21) Appl. No.: 09/433,549

(22) Filed: Nov. 4, 1999

(51) Int. Cl.[7] .............................. G06F 7/00; G06F 19/00

(52) U.S. Cl. .............................. 701/35; 701/28; 701/29; 340/438; 340/439; 340/937

(58) Field of Search .............................. 701/28, 29, 33, 701/34, 35, 66, 63, 48; 340/933, 937, 438, 439

(56) References Cited

U.S. PATENT DOCUMENTS 5,435,184 7/1995 Pinerolli et al.. .................... 73/489
5,445,027 * 8/1995 Riley, Jr. et al. .................... 73/489
5,446,659 * 8/1995 Yamawaki .................... 701/35
5,477,141 12/1995 Näther et al. .................... 324/160
5,581,464 12/1996 Woll et al. .................... 364/424.04
5,671,451 9/1997 Takakkhashi et al. .................... 396/310
5,680,117 10/1997 Arai et al. .................... 340/903
5,696,705 12/1997 Zykan .................... 364/561

* cited by examiner

*Primary Examiner*—William A. Cuchlinski, Jr.
*Assistant Examiner*—Gertrude Arthur
(74) *Attorney, Agent, or Firm*—Nixon & Vanderhye P.C.

(57) ABSTRACT

Systems for sensing, storing and updating operation parameters, visual conditions and audible conditions for an automotive vehicle include a plurality of sensors for registering vehicular operation parameters, including at least one vehicle-mounted digital video/audio camera. A microprocessor controller responsive to the vehicle operational parameters which have been registered by the plurality of sensors and video images and audio signals from the video/audio camera is provided for processing the operational parameters and the video images and the audio signals. A rewritable non-volatile memory is provided for storing those processed operational parameters, video images and audio signals which are provided by the microprocessor controller. The microprocessor controller updates the rewritable memory as new parameters, video images and audio signals are sensed. When the data is converted to computer-readable form and is read by a computer, an accident involving the automobile may be reconstructed.

18 Claims, 2 Drawing Sheets

TRAFFIC ACCIDENT DATA RECORDER AND TRAFFIC ACCIDENT REPRODUCTION SYSTEM AND METHOD

BACKGROUND OF THE INVENTION (a) Field of the Invention

The present invention relates to a traffic accident data recorder mounted on a vehicle for land transportation such as a car. The invention further relates to a traffic accident reproduction system for reproducing and reconstructing the traffic accident by using the traffic accident data stored in the traffic accident data recorder. Hereinafter this traffic accident data recorder will be called an ADVANCED VIDEO BOX (AVB).

(b) Description of the Prior Art

Most commercial aircraft and some private aircraft are equipped with an event recording device commonly called a "black box". This device recorded pertinent data from the major subsystems of the aircraft as the aircraft was operating. If an accident occurred, the "black box" generally can be retrieved from the aircraft and the recorded information can be extracted to determine the status of subsystems of the aircraft just before the accident. Such information can then be used to reconstruct the events leading up to the accident, and can help determine the cause of the accident. Black box recording devices have proven invaluable in aircraft accident reconstruction. However, this type of technology is quite expensive, and its use has been limited to more expensive vehicles, e.g., aircraft. In addition, it is believed that all such devices operate using a cumbersome magnetic tape to record data. These devices also tend to be larger, heavier, and consume more power than would be acceptable for automotive use.

In the area of automobile accident reconstruction in the past, an accident investigating officer generally determined how an accident most probably occurred by measuring, among other things, the length of skid marks, the extent of vehicle and nearby property damage, and the condition of the road at the time of the accident. This method of reconstructing accidents was expensive and inaccurate at times.

Generally, it is very advantageous to know the condition or state of a vehicle when a traffic accident has occurred involving the vehicle, in order to determine the cause of the accident. It is also very advantageous to analyze data of, for example, acceleration, angular velocity, etc. of the vehicle at the accident occurrence time. Transitory events, e.g., accident scenes in particular, must be accurately and quickly recorded in situ prior to the removal of the affected vehicles for purposes of later reconstructing the relative position of various features and objects and their relationship to fixed positions at the site. This was usually accomplished manually. The data collected was then utilized to establish the final position of the vehicles and associated debris as well as to provide information from which reasonable inferences might be drawn concerning the events leading up to the accident.

Because, by their very nature, vehicular accidents almost always occur on or adjacent to roadways, the conventional methods of accurately recording the data necessary accurately to establish relative vehicle positions with respect to fixed adjacent objects (e.g., road signs, telephone poles and the like) utilizing a roll-a-tape, clipboard and pencil required that the accident scene not be disturbed for an extended period of time prior to clearing. During this laborious investigation process, other vehicular traffic is either slowed or totally obstructed which can itself lead to secondary incidents or accidents involving other vehicles or individuals assisting at the scene.

It is therefore vitally important that the accident investigating officer record, and then clear, an accident scene as rapidly as possible. Nevertheless, the data recorded must be accurate and verifiable for later use in reconstructing the incident and formal procedures must be followed such that the integrity of the data gathered might be ensured. Heretofore two methods of determining distances regarding an accident scene have been generally employed utilizing a mechanical distance measuring device, e.g., a roll-a-tape combined with the manual recordation of the distances on a clipboard.

The "baseline" (or "baseline/offset") method was one recordation technique in which an imaginary grid or coordinate system was established overlying the accident scene with a first axis which was fixed between two permanent objects or positions adjacent to the site (e.g., traffic signs, utility poles and the like) which were utilized as control points. The accident investigating officer must then manually measure a series of distances along the first axis to establish various positions (e.g. the abscissa), at which positions the accident investigating officer must then additionally walk off and make a like series of right angle measurements to vehicle tires, skid marks and the like to establish the coordinate along the second axis (e.g. the ordinate). The resulting "x,y" values can then be utilized to reconstruct the accident scene on a grid for subsequent investigation.

An alternative technique was the "triangulation" (or "range/triangulation") method. In practice, this technique required that a pair of fixed object or position control points also be selected and the distance between them established by manual measurement. The accident investigating officer then positioned himself or herself adjacent to the various points of interest (e.g., the left front tire of the first vehicle, the right front tire of the second vehicle, and the like) and then walked off and measured the distance to both of the control points for each point of interest. The resultant data was then utilized to calculate the "x,y" position of the various points with respect to the control points by knowledge of the lengths of the three sides of the triangle formed.

In practice, the baseline technique was the most time consuming to implement in the field but was the most expeditious to reconstruct back at the police station. The converse was true of the triangulation method. However, regardless of the technique employed, current roll-a-tape, clipboard and pencil techniques were time consuming as well as being subject to measurement errors when obstructions were in the path of the measurement to be made and recordation errors which might not be detected until after the accident had been cleared. Moreover, during the entire process, the normal traffic flow at the scene was disrupted and the accident investigating officer was exposed to the attendant dangers of making the measurements for an extended period of time.

Short-distance, or residual-distance, recording devices have been provided in motor vehicles and have been used for analyzing the last distance travelled before a stop, possibly a stop which was caused by a collision. A wide range of recording principles were already known for devices of this type, e.g., principles which enabled immediate examination of the recordings, as well as those in which speed values were generally written into an electronic storage, continuously in a determined clock cycle as data records, sometimes together with other data, the least current data records being erased.

Special accident recording devices were also known in which accident data were determined, preferably by means of acceleration sensors, and were stored for a relatively brief period, in a time-based manner, wherein additional information which concerned, for example, brake actuation, blinker operation and illumination, was compiled as an interpretation aid. Such a device permanently stored the accident data when the vehicle actually underwent accelerations beyond the range of possible accelerations which were brought about by the nature of the road and the driving dynamics, i.e., in the event of genuine impacts caused by traffic accidents. In this way, the processor capacity and storage space can be confined to authentic accident situations.

Recordings made by devices of the first group can provide a certain support for recording and interpreting accidents in that the speed curve, which preceded the stopping of the vehicle, was analyzed on the spot and status data, which had been compiled, e.g., "brake applied", "blinker on" and the like, can be taken into account regardless of whether or not the vehicle had undergone an impact resulting from an accident.

However, the actual reaction of the driver, the driving situations which resulted neither in a stopping of the vehicle nor in a collision, or hit-and-run situations, cannot be detected because these recordings were overwritten when the vehicle resumed driving. The same can also be said of the devices which exclusively recorded collisions. While these devices enabled an exact analysis of the events which preceded and which followed an accident, this analysis can only be undertaken by experts. Also, the cost of such devices generally exceeded the acceptable limits for monitoring devices, which were not required by law, especially since they were used relatively rarely or not at all for the entire operating life of a vehicle. On the other hand, the first group of devices can be used much more frequently, namely, for traffic checks.

Generally, when a vehicle encountered a traffic accident, it was quickly braked or, without quick braking, it crashed against or collided with something, or something collided with it from behind. Therefore, if the acceleration and angular velocity of the vehicle were to be recorded, it is possible to know with their rapid changes the time when the traffic accident occurred. It would be useful to take a picture at the moment of an accident, however, when a vehicle collision occurred, there was no practical way to take a picture at the instant an accident has occurred. An impact-actuated inertial switch was required to trigger a camera. Various devices employed spring-biased movable masses to open or close an electrical circuit or do mechanical work when the device was subjected to a sudden acceleration change. The typical impact sensor utilized a movable mass that was biased to a normal position by compressed springs or magnetic attraction. The movable mass was often shaped in the form of a spherical or metal ball and was constrained to move through a closed chamber against the restraining force of the biasing means upon receiving an inertial force from the proper direction. By such means a photographic image at the instant of impact was said to be provided.

Many patents have been issued which purported to provide a system and method for reconstructing an accident.

U.S. Pat. No. 5,435,184, patented Jul. 25, 1995, by Pineroli et al., provided a device for detecting running variables e.g., the lighting up of a warning lamp, the positioning of a roll bar, the activation of a belt tightener and/or of an air bag, etc. in a motor vehicle. The device included at least two acceleration sensors to detect the longitudinal and transverse acceleration of the motor vehicle, and an evaluation circuit with a resettable time measuring unit which determined acceleration values from the sensor signals over a given period of time. A signal divider was connected to the signal output of each acceleration sensor to divide the sensor signal into a low-frequency (LF) signal component and a high frequency (HF) component. An adder was connected to the LF outputs of the signal dividers for the vectorial addition of the LF components of both sensor signals corresponding to the longitudinal and transverse acceleration components. A storage unit was connected to the adder and the time measuring unit to store the calculated acceleration values over the measured time. A control unit was connected to the HF outputs of the signal dividers to control the time measuring unit. There was no disclosure of any means for reconstructing an accident.

U.S. Pat. No. 5,445,024, patented Aug. 29, 1995, by Riley, Jr. et al. disclosed an automotive motive recorder, which recorded and stored the information necessary for a determination of the pre-impact speeds and the impact speed of a motor vehicle which was involved in a collision. Following an accident, the unit may be removed and be connected to a personal computer as a reader. With entry of the proper access code, the data pointer outputted the stored information in the correct sequence for analysis.

U.S. Pat. No. 5,446,659, patented Aug. 29, 1997, by Yamawaki, provided a traffic accident data recorder and traffic accident reproduction system which included an acceleration sensor, an angular velocity sensor, if necessary, a memory, and a control section for controlling the recording in the memory. When the output datum from the acceleration sensor or the angular velocity sensor exceeded a predetermined value, the control section recognized that time as a traffic accident occurrence time, and stored the acceleration data and angular velocity data before and after in the memory. By analyzing the data with a traffic accident data reproduction system, it was possible to reproduce the state of the vehicle at the traffic accident occurrence time.

U.S. Pat. No. 5,477,141, patented Dec. 19, 1995, by Nather et al., provided a registration arrangement for motor vehicles with a measured value presentation, which was said to be suitable for evaluating accidents. A storage arrangement was provided in which speed measurements were simultaneously written into at least two parallel storage branches. A plurality of time-limited storage areas were defined in each storage branch. Each storage area had a storage portion which can be operated as a ring storage and a storage portion which was arranged subsequent to the latter, which can be operated as a linear storage. The speed values, which were written into the ring storage in a continuous manner during the course of normal driving, were permanently stored in one storage branch when one criterion occurred, and in the other storage branch when the criterion which was greater than a deceleration threshold value occurred. Subsequent speed values were written into the linear storage of the respective storage areas until the set time limit, after which a free storage area of the respective storage branch was switched to.

U.S. Pat. No. 5,581,464, patented Dec. 3, 1996, by Woll et al., an apparatus and method for recording operational events in an automotive radar system. The invention provided what was called an Event Recording Apparatus (ERA) that recorded selectable vehicle performance, operational status, and/or environment information, including information which would be useful for accident analysis and updated software for use by a system processor which was capable of reading data from the ERA. The ERA included a non-volatile solid-state memory card, a memory card adapter which was located in a vehicle, and a microprocessor, either as part of the memory card or embedded in a system within the vehicle, for controlling the storage of data within the memory card. The ERA was configured to store such vehicle information as the closing rate between the recording vehicle and targets located by the radar system of the vehicle, distance between the recording vehicle and targets, vehicle speed, and such vehicle operational status and environment information as braking pressure, vehicle acceleration or deceleration, rate of turning, steering angle, hazard levels determined from a radar system processor, target direction, cruise control status, vehicle engine RPM, brake temperature, brake line hydraulic pressure, windshield wiper status, fog light status, defroster status, and geographic positioning information.

U.S. Pat. No. 5,696,705, patented Dec. 9, 1997, by Zykar, provided a system and method for data entry and retroactive reconstruction of the relative position of features and objects. In particular, this was provided with respect to transitory occurrences, utilizing a signal transmitting and receiving distance determining device. The system and method disclosed had especial applicability to the on-scene recordation and subsequent ex post facto reconstruction of traffic accident scenes by law enforcement officers. It was said to be readily implemented in conjunction with a commercially-available, laser-based speed and distance determining device otherwise usable for vehicle speed traffic monitoring functions, utilizing either triangulation or baseline/offset mensuration techniques.

U.S. Pat. No. 5,671,451, patented Sep. 23, 1997, by Takahashi et al., provided a data recording unit for use with a camera for recording information data, obtained through a GPS receiver, on a photographing film. The data recording unit included a selector for selecting a geodetic system from plural geodetic systems. A data converter was provided for converting a position information data, obtained through the GPS receive, to converted position information data in the geodetic system which was selected by the selector. A printing LED was provided for recording the converted position information data on the photographic film together with images which were photographed by the camera.

U.S. Pat. No. 5,680,117, patented Oct. 21, 1997, by Arac et al., provided a collision judging system for a vehicle. Such system included a sensor for detecting a relative speed between a subject vehicle and an object, and a judging section for judging a possibility of collision of the subject vehicle with an object based on the relative speed. In the collision judging system when an output from the differentiating device exceeded a preset value, a signal which was indicative of a command to prohibit the judgment of the possibility of collision in the judging section was outputted from the prohibiting-signal outputting device, thereby avoiding the unnecessary judgment of the possibility of collision in the judging section.

More recently, automobiles in the U.S. have been equipped with hidden "black boxes", stripped-down versions of the flight-data recorders that sometimes reveal the causes of airline catastrophes as previously described. The latest version of the recorder, known as a sensing and diagnostic module (SDM), kept track of the last five seconds before an impact. It cataloged speed, the position of the gas pedal, when the brakes were finally applied and whether the driver was belted, all in an attempt to improve safety through research.

SUMMARY OF INVENTION

(a) Aims of the Invention

Accordingly, it would be desirable for automotive vehicles to have a system that would function as an event-recording "black box". Such a system should record visual and operational information relating to the vehicle and the environment around the vehicle at the moment previous to, and during, an accident. Such data should be accessible for reconstructing the events that happened. An accident could then be reconstructed using real historical data, as opposed to post-accident, estimated data.

It is therefore one object of this invention to provide an ADVANCED VIDEO BOX, (AVB), with which it is possible to determine a traffic accident occurrence time, and to obtain pertinent visual and operational data during a predetermined time period both before and after the recognized time.

It is a second object of the invention to provide an AVB, which can reproduce the traffic accident from pertinent visual and operational data which is stored in the AVB.

It is a third object of this invention to provide a method and means for conveniently and comprehensively documenting an automobile accident scene including visual images wherein each and every component thereof is coordinated and fully functional.

It is a fourth object of this invention to provide an AVB to operate an imaging device whereby visual images will be recorded continuously and automatically before, during and after a vehicle collision occurs.

Yet a fifth object of this invention is to provide for an AVB for recording visual and operational data relating to motor vehicles, which can be provided at a reasonable cost.

It is a sixth object of the present invention to provide an AVB which enables production of the desired record of an accident using signals which are already present in motor vehicles as well as being coordinated with visual images and audio signals.

It is a seventh object of the present invention to provide an AVB which can be easily installed as an autonomous device which occupies little space, and is not reliant upon attitude or position for the production of visual and operational data relating to an automobile accident.

It is an eighth object of the present invention to provide such an AVB which can be easily integrated in a wide range of different vehicles.

It is a ninth object of the present invention to provide such an AVB wherein redundant storage and processor capacity can be made use of in electronically-controlled recording devices.

(b) Statements of the Invention

A first embodiment of the present invention provides a traffic accident data recorder, namely a system for sensing, storing and updating operational parameters, visual conditions and audible conditions associated with an automotive vehicle, comprising (i) a plurality of sensors for registering vehicular operational parameters, including at least one vehicle-mounted digital video/audio camera, (ii) microprocessor control means responsive to the vehicle operational parameters which have been registered by the plurality of sensors for processing the operational parameters and the visual images and audio signals from the digital video/audio camera, (iii) rewritable non-volatile memory means for storing processed operational parameters, visual images and audio signals which are provided by the microprocessor control means, and (iv) the microprocessor control means updating the rewritable memory as new parameters, visual images and audio signals are sensed.

A second embodiment of the present invention provides a method for recording events relating to an accident involving an automobile, the method comprising the steps of (a) providing a plurality of sensors for registering vehicular operational parameters, including at least one vehicle-mounted digital video/audio camera, (b) providing a microprocessor control means which is responsive to the vehicle operational parameters which have been registered by the plurality of sensors for processing the operational parameters and the visual images and audio signals from the digital video/audio camera, (c) providing rewritable non-volatile memory means for storing processed operational parameters, visual images and audio signals which are provided by the microprocessor control means, (d) providing receiving and transmitting interface means for receiving vehicular operational data and for receiving digitized video signals and audio signals, and for transmitting the vehicular operational data and for transmitting the digitized video signals and audio signals to the rewritable non-volatile memory means, (e) providing a computer interface adapter for coupling to the rewritable non-volatile memory means, (f) providing the computer interface adapter with computer interface means for storing the vehicular operational data and the digitized video images and audio signals in a computer-readable form, (g) coupling the computer interface adapter to a computer which has been loaded with an appropriate computer program, (h) reading, into that computer which has been loaded with that appropriate computer program, the computer-readable vehicle operational data, and the digitized video images and audio signals, and (i) executing the computer program for reconstructing an accident involving the automobile.

(c) Other Features of the Invention

By one feature of the first embodiment of the invention, a digital video/audio camera is provided for viewing forwardly, and placed in the rear view mirror to provide a video image and audio signals of an oncoming forward path of travel of the automotive vehicle.

By a second feature of the first embodiment of the invention and/or the first feature thereof, a digital video/audio camera is provided for viewing rearwardly to provide a video image and audio signals of a previous rearward path of travel of the automotive vehicle.

By a third feature of the first embodiment of the invention and/or the above features thereof, a digital video/audio camera is provided for viewing each side of the automotive vehicle.

By a fourth feature of the first embodiment of the invention and/or the above features thereof, the microprocessor control means and the rewritable non-volatile memory means are housed on a tamper-proof, but removable, box which is fixed to the automotive vehicle.

By a fifth feature of the first embodiment of the invention and/or the above features thereof, the microprocessor control means continuously updates the rewritable non-volatile memory means.

By a sixth feature of the first embodiment of the invention and/or the above features thereof, the control means periodically and regularly updates the rewritable non-volatile memory means.

By a seventh feature of the first embodiment of the invention and/or the above features thereof, the operational parameters of the automotive vehicle are related to events which are internal to the automotive vehicle and which are selected from at least one of braking pressure, brake temperature, brake line hydraulic pressure, average speed, acceleration or deceleration in one or more dimensions, rate of turning, steering angle, compass direction of travel, impact, tire pressure, cruise control status, windshield wiper status, fog light status, defroster status, and geographic positioning information.

By an eighth feature of the first embodiment of the invention and/or the above features thereof, the modulated digitized video images and the audio signals are related to events which are external to the automotive vehicle and are selected from at least one of the closing rate between the automotive vehicle and an obstacle and/or another automotive vehicle, the distance between the automotive vehicle and an obstacle and/or another automotive vehicle, and the direction of an obstacle and/or another automotive vehicle.

By a ninth feature of the first embodiment of the invention and/or the above features thereof, the non-volatile memory means includes one of a dynamic RAM with a battery backup and a refresh memory, a static RAM with a battery backup, and an electrically-alterable ROM.

By a tenth feature of the first embodiment of the invention and/or the above features thereof, the storing of the processed operational parameters, and of the digitized video images and audio signals is commenced upon turning "on" the ignition of the automotive vehicle.

By an eleventh feature of the first embodiment of the invention and/or the above features thereof, storing of the processed operational parameters, and of the digitized video images and audio signals, is terminated upon turning "off" the ignition of the automotive vehicle.

By a twelfth feature of the first embodiment of the invention and/or the above features thereof, the storing of the processed operational parameters is terminated upon turning "off" the ignition, and the storing of the processed digitized video images and audio signals is terminated automatically.

By a thirteenth feature of the first embodiment of the invention and/or the above features thereof, the rewritable non-volatile memory means includes multiple logical data pages for storing independent sets of data.

By a fourteenth feature of the first embodiment of the invention and/or the above features thereof, the system includes (v) a computer interface for coupling to the rewritable non-volatile memory means and to an external computer which is loaded with an appropriate computer program, the computer interface providing means for storing the vehicular operational data and the digitized video images and audio signals in a computer-readable form and (vi) analyzing means which are operated upon executing the computer program for accessing the operational data, the digitized video images and the digitized audio signals, and for enabling the computer to analyze the operational data values, the digitized video images and the digitized audio signals for reconstructing an accident involving the automobile.

By a first feature of the second embodiment of this invention, the reconstructed accident is displayed on a monitor of the computer, and/or is printed frame-by-frame, and/or is converted to video/audio tape for viewing via a VCR.

By a second feature of the second embodiment of this invention and/or the first feature, the computer program is password protected.

(c) Generalized Description of the Invention

This invention consists of a device which can detect and register operational parameters of an automotive vehicle, including images and sounds of the surrounding environment. As noted previously hereinabove, this invention will be designated ADVANCED VIDEO BOX (AVB). Such AVB is composed of a recorder system which is equipped with a non-volatile memory to which the sensors showing the different operational data of the automotive vehicle (speed, acceleration, brakes pressure, etc.) and to which one or more digital video/audio cameras are also connected. These digital video/audio cameras are strategically placed to give images and sounds of the surrounding environment of the vehicle. This invention provides an excellent means for the reconstruction of accidents, crimes and other events which involve a vehicle which is equipped with AVB.

The AVB consists of: (i) a recording device; (ii) a fixed number of sensors to detect the vehicle operational data; (iii) one or more digital video/audio cameras to capture images and sounds; and (iv) the interconnections between these elements.

The recording device of the AVB has a non-volatile memory which is capable of recording the vehicle operational data, including images and sounds which are captured by one or more video/audio cameras which are installed in the vehicle. All such data is received by a microprocessor and is re-transmitted to the non-volatile memory.

The AVB has a section which receives electrical energy from the automotive vehicle through normal electrical installations and includes means for charging its own internal battery, in order to be able to protect the recorded data in case of lack of electrical energy from the automotive vehicle. Consequently, the AVB will store the information even when the car battery is exhausted, because the AVB is equipped with its own independent, internal battery.

The recording device of the AVB will be placed within the interior of a sealed, water-proof, metallic box which is protected against fire and shocks, to avoid damage to the elements inside the box. This box will be installed in the statistically-safest place in the automotive vehicle (e.g., under one of the front seats) and will be firmly and uniquely fixed to the car framework in such a way that only a competent authority would possess the special "keys" to disconnect it. Only that competent authority would also have the electronic key and the necessary software to "read" the data from the AVB. In order to "read" that data, such authority would have to gain access to the AVB. As will be described hereinafter, these "keys" preferably include a password-protected computer program.

In addition, the AVB will be equipped with an interlocking mechanism which will prevent the motor of the automotive vehicle from starting if the AVB is disabled or is disconnected.

The AVB would begin recording when the ignition switch is turned "ON" and would normally stop recording when the ignition switch is turned "OFF". A clock system will incorporate the date and time to all registered data. However, the AVB may continue to record visual images and audio signals even if the ignition switch is turned "off".

When the storage capacity of the non-volatile memory is used up, the AVB starts recording while erasing the oldest previous data, keeping in the memory only the latest recordings.

The signals which are captured by the different operational parameters sensors of the automotive vehicle will be connected to the recorder device. Examples of such parameters include speed, acceleration, brake pressure, brake temperature, cruise control status, windshield wiper status, position lights status, turning lights status, brake lights status, horn status, seal belts status, airbags status, engine RPM, geographic positioning information (GPS), inclinometer, etc.

The recorder device will also simultaneously receive the information given by a first video/audio camera which is mounted on the internal rear mirror, through the connection of an optical fiber. This video camera will capture what happens in front of the vehicle. Additionally and optically, the AVB will be able to be provided with more video/audio cameras which may record images from other areas around the vehicle, e.g., the rear to record rear end collisions, and at the right and/or left hand sides to record side collisions.

The digitized video images and audio signals from the digital video/audio camera are modulated to be recorded in computer-readable form. Thus, the AVB is provided with a computer interface for coupling to the rewritable non-volatile memory means and to an external computer. The computer interface thereby provides means for storing the vehicular operational data and the digitized video images and audio signals in a computer-readable form.

Once all the signals are stored in computer-readable form, e.g., on a disc, the disc can be downloaded into a computer which is loaded with a suitable computer program. Upon subsequent execution of the computer program, the computer effects an analysis of the operational data values, the digitized video images and the digitized audio signals for reconstructing an accident involving the automotive vehicle. This reconstructed accident can be displayed on the computer monitor and/or on paper hard copies and/or can be converted to a video/audio tape for replaying, either through a VCR or through a video/audio camera.

The computer program is protected by a password so that the computer-readable disc can only be read by a competent authority.

The interconnections will be such that it will not be possible to modify them, or be interrupted without the AVB detecting it. The AVB will prevent the engine of the automotive vehicle from starting until the damage is repaired and all the AVB functions have been restored.

The video/audio cameras will be interconnected to the AVB by means of optical fibers, guaranteeing an excellent quality and low interferences in the recorded images.

The operational parameters include various data between the sensors and the computer interface. The acceleration data shows the speed changes of the automotive vehicle at the accident occurrence time. From that data, the severity of the collision can be deduced. The acceleration data may be measured by any conventional acceleration measurement means, for at least the travelling direction of the vehicle and, if necessary, for directions other than the travelling direction in three-dimensional space. The measurement may be carried out constantly while the vehicle is running. Acceleration sensors of various conventional types may be used, e.g., the strain gauge type, capacitance type, piezoelectric type and differential transformer type. The acceleration which is measured by the acceleration sensors are outputted to the AVB as acceleration data.

The angular velocity data show the changes in direction or position of the automotive vehicle at the accident occurrence time. From that data, how the direction of the vehicle had changed due to the occurrence of the accident occurrence time can be deduced. The angular velocity data may be measured by conventional angular velocity measurement means, on the angular velocity about at least one direction in three-dimensional space and, if necessary, on the angular velocity about other directions. This measurement may also be carried out constantly while the vehicle is running. Various commercial angular velocity sensors may be used as an angular measurement means. The angular velocity which is measured by the angular velocity measurement means is outputted as angular velocity data.

The AVB of embodiments of this invention includes an automotive vehicle motion recorder which will furnish necessary data to determine the speeds of automotive vehicles at accident impact and prior to accident impact. The AVB may include a pair of horizontal accelerometers, one oriented in the direction of travel and the other oriented perpendicular to the direction of travel. This provides a speed history of the automotive vehicle both before and after an accident.

The above data are outputted to the AVB and are stored by the storage means. The storage means may be a semiconductor memory or a magnetic recorder using a magnetic medium or the like. A control means controls the storage of the data in the storage means.

As noted hereinabove, the data which is recorded includes two events. The first events are those which are internal to the vehicle, e.g., braking pressure, acceleration or deceleration in one or more dimensions, rate of turning, steering angle, cruise control status, brake temperature, brake line hydraulic pressure, average speed, miles-per-gallon, compass direction of travel, coolant temperature, oil temperature, engine temperature, transmission fluid temperature, engine timing, impact, tire pressure, windshield wiper status, fog light status, defroster status, and geographic positioning information. The second events are those which are external to the automotive vehicle, e.g., obstacles, other automotive vehicles and other views and sounds by means of the video/audio cameras.

The recording device of the AVB may include a signal processing module which includes a digital signal processor (DSP), a microcontroller, and a field programmable gate array, which is configured to control the flow of digital data to the DSP under the control of the microcontroller. The signal processing module is also coupled to an input/output module.

As noted above, the input/output module provides internal information from the above-noted variety of vehicle sensors to the microcontroller to indicate the operational status and environment of the vehicle. As alluded to above, commonly known sensors may be used, for example, to measure vehicle speed, engine temperature, oil pressure, engine RPM, oil temperature transmission fluid temperature, coolant temperature, and other values relating to the environment or performance of the vehicle. Additional internal information can be obtained by providing other sensors, e.g., a brake pedal pressure sensor, brake hydraulic line pressure sensor, tire pressure, accelerometer sensors (for example, fore and aft acceleration/deceleration, and/or left and right (yaw) acceleration of the vehicle), turning rate, turn angle, and/or impact sensors (such as the type used to trigger vehicle air bags), windshield wiper status (to determine if it is raining), fog light status (to determine visibility), defroster status, and geographic positioning information. Recording of some or all of this data or similar relevant data would make accident reconstruction more reliable and less expensive.

The recording device of the AVB may also include a RAM card which is coupled through an interface receptacle to a microcontroller (which may be the main microcontroller previously referred-to, but can be an independent microcontroller which is coupled to the main microcontroller). The microcontroller includes a real time clock. The microcontroller is also coupled to a non-volatile memory device. "Non-volatile" means that the data stored in the memory device will be retained even if power is interrupted to the device. The memory device may be a "flash" programmable memory device which is commercially available from a number of suppliers. Such devices are electrically alterable, but retain their data even after power is removed from the device. Alternatively, the memory device may comprise, for example, dynamic RAM with a battery backup and refresh circuitry, a static RAM with a battery backup, an electrically-alterable read-only memory, or other solid-state, non-volatile memory technologies which are known in the art.

The microcontroller and the non-volatile memory device are coupled in known fashion by the usual address and data buses, and read/write control lines, such that the microcontroller can read data from, and write data to, the non-volatile memory device. The non-volatile memory device may also be used to store programs to be executed by the microcontroller for the read-out of the recorded data.

The RAM card comprises one or more non-volatile memory devices and appropriate control and interface circuitry. The RAM card may comprise, for example, dynamic RAM with a battery backup and refresh circuitry, static RAM with a battery backup, flash memory devices, electrically alterable read-only memory, or other solid-state, non-volatile memory technologies known in the art. The data storage capacity of the RAM car is a mattery of design choice and commercially-available integrated circuit chip capacity and size, e.g., at least about 32 kBytes.

The memory may be a static RAM with sustaining power which is supplied by a battery, permitting the RAM card to be removed from the RAM card receptacle. The battery backup also protects against data loss if the power from the RAM card receptacle is interrupted due to system failure or an accident.

In the general operation of the AVB, a suitable RAM card would be inserted into the RAM card receptacle. Selected data would be gathered from the vehicle sensors and the video/audio cameras which provide video images and audio signals and by the signal processing module by the microcontroller, typically after the vehicle is started. The data is stored into the RAM card by the microcontroller at periodic intervals or continuously, which may be determined by time and/or by distance travelled. The microcontroller may also do some computation on the data, e.g., average speed, to derive processed data for storage in the RAM card.

Data blocks may be stored in the RAM card beginning at the first location in the memory. The address would be incremented to point to successive storage locations for storing subsequent data blocks.

Different modes of operation can be used. In a first mode of operation, selected data is stored approximately every 0.5 seconds, until the memory on the RAM card is full. Thereafter, the address sent to the RAM card by the microcontroller is reset to the first address used, causing the oldest data in the memory to be overwritten with new data (i.e., the memory is operated as a circular queue). This provides a "moving window" of a predetermined latest times of operation. Recording can be stopped when external power to the RAM card is turned off (for example, when the vehicle is turned off voluntarily). If desired, a delayed turn-off time can be used to continue recording for some period of time after external power is removed after the vehicle is turned off.

In a second mode of operation, the memory is divided, in a static or dynamic fashion, into multiple logical "pages" for storing independent sets of data. A "current" page may be used to record a moving window of, for example, selected data from a predetermined last minute of operation. One or more additional pages can be used to record, for example, selected data (which need not be the same items of data stored in the current page) for fixed or variable time periods for later analysis. In such a case, when a page fills up, writing stops, in order to preserve an archival record of the selected data. A page would be "reset" after a read-out of the data or upon execution of a specific command, permitting new data to be written to the page.

In one variation of the second mode of operation, a first page may be used to record a moving window of selected data. If an accident occurs, the first page of data is "frozen", and a next page is used for subsequent recording. An accident condition is detected automatically. In this manner, data can be captured for later analysis of the accident.

In a second variation of the second mode of operation, recording to a page other than the current page may be triggered by an unusual event, e.g., an accident. Such recording may be triggered by an unusual condition that may indicate an accident, e.g., a sudden acceleration or deceleration, sudden application of the brakes, activation of an air bag, etc. Recording such information on a separate page in the memory, and only upon being triggered by a particular event, permits capturing data for later analysis.

In a third mode of operation, the recording rate may be increased upon the occurrence of an unusual condition, e.g., a sudden acceleration or deceleration, sudden application of the brakes, activation of an air bag, etc., in order to store more data values surrounding the event, for later analysis.

One skilled in the art would recognize that variations and combinations of the these modes of operation could be implemented with the present invention as a matter of design choice.

To read out the data collected in the RAM card, the competent authority which is provided with the necessary "key", removes AVB and then removes the RAM card from the interface receptacle of the AVB, and inserts it in a compatible interface which is coupled to a personal computer. The program which is loaded in the personal computer is password-protected, so that only a competent authority can access the data. The data can then be displayed on the monitor of the computer and/or printed as a hard copy and/or may be stored on a different memory device, e.g., a floppy disk and/or a hard drive in the computer and/or on video/audio tape to be displayed via a VCR.

In order to analyze the data, it is necessary to provide an interface between the RAM card and a personal computer (PC). An interface receptacle, which is identical to the interface receptacle in the AVB, would be coupled to a bidirectional connector that is connected to a parallel port of the PC. The bidirectional connector may also provide a parallel interface signal pass-through so that a standard parallel interface device, e.g., a printer, may be coupled to the PC through the parallel port. Such pass-through type connectors are well-known in the art.

When, as described above, a RAM card is removed from the AVB, the RAM card is inserted into the interface receptacle for data retrieval by the PC. Data is then read out of the RAM card under control of the microcomputer of the PC.

Once data has been retrieved from the RAM card, it can be displayed on the PC in a variety of ways, to provide accident reconstruction information. The manner of presentation of the data is a matter of design choice. The AVB of an embodiment of the present invention may be used in conjunction with any microcontroller-based or microcomputer-based system that gathers data about various vehicle performance and environment factors and can control the loading of such information into the memory device.

Thus, the AVB of an embodiment of the present invention records data until an event, e.g., an accident, stops the recording. However, recording may be programmed to continue for a fixed time after an accident to record the activity after the accident. As described above, the RAM card can then be removed and the events leading up to the event can be read back using a standard personal computer with a matching interface. The AVB of an embodiment of this invention is thus extremely useful for accident reconstruction. The RAM card also uses rugged and durable technology that is suitable for integration into an automotive system.

The AVB of an embodiment of this invention recognizes the traffic accident occurrence time. The traffic accident occurrence time is recognized, and the acceleration data and, if necessary, the angular velocity data and the video images and audio signals are continued to be stored in the storage means. When the predetermined time has passed after the traffic accident occurrence time and/or when desired, the acceleration data and angular velocity data are either automatically or manually stopped from being stored in the storage means.

The AVB of an embodiment of this invention stores the acceleration data and the angular velocity data as well as optical image and audio signal data before and after the traffic accident occurrence time. The storage means stores the acceleration data and angular velocity data as well as the optical image and audio signal data. This recording is carried out endlessly, and accordingly, new data replace old data in order at regular intervals. The AVB of an embodiment of the invention reproduces visually on, for example, a display screen, the speed and direction of the automotive vehicle, which has encountered the accident, according to the acceleration and, if necessary, the angular velocity of the automotive vehicle. This easily allows the cause of the accident to be analyzed further.

The AVB of an embodiment of the present invention is easily installed as an autonomous device since it occupies little space, and is not reliant on attitude or position. The AVB of an embodiment of this invention can be integrated easily in a wide range of different vehicles.

One manner of analyzing a traffic accident will now be explained. First, the traffic accident data recorder is removed from the automotive vehicle by a competent authority having the required "key". Then the image data and the operational data are read out of the memories into a personal computer which includes both an input and output password. Next, the computer analyzes the data and visually, continuously shows on the screen of a monitor display the speed, direction, and position of the automotive vehicle and the image view from the video/audio camera. The totality of the image data, the audio data and the operational data makes it possible to reproduce a continuous image of the state of the automotive vehicle up to the crash and stop and, optionally, for a period thereafter. The continuous image can be reproduced not only on a screen, but also frame-by-frame on paper by printing it out by a printer and/or on a tape to be displayed via a VCR. The traffic accident data recorder of each of the above embodiments uses data from the automotive vehicle. It is possible to analyze a traffic accident easily by a simple operation of securing the video/audio camera to the car at the front rear view mirror and/or the rear dashboard and/or at the sides and interconnect it with the data from the automotive vehicle into the AVB which is secured in the automotive vehicle, e.g., under the seat.

The AVB of an embodiment of this invention can easily analyze the speed, position, direction, etc. of an automotive vehicle and the pictorial image of the road at a traffic accident occurrence time. According to the data which is recorded by the AVB, it is possible to look into the cause of the accident accurately in a very short time. Also, because a traffic accident can be reproduced visually, it is possible to look into the cause of the accident.

In a case of a rear-end collision, the data will indicate clearly that there was a rear-end collision. Thus, it is within the ambit of this invention to provide a second video/audio camera aimed through the rear window of the car to provide a pictorial image of the road at the time of the rear-end collision. In this case, it is possible to record a traffic accident of the car in more detail, and thereby analyze the rear-end accident in more detail. In addition, other video/audio cameras can be mounted at the side of the vehicle to provide a pictorial image of a side collision.

More strict accident analysis can be made if a GPS (global positioning system). using a space satellite, is utilized to record the absolute time and the absolute position.

Since the AVB can easily analyze the speed, position, direction, etc. of an automotive vehicle at a traffic accident occurrence time, according to the data which is recorded therein, it is possible accurately to look into the cause of a traffic accident in a very short time. Because a traffic accident can be reproduced visually, it is possible easily to look into the cause of the accident.

Figure 1:
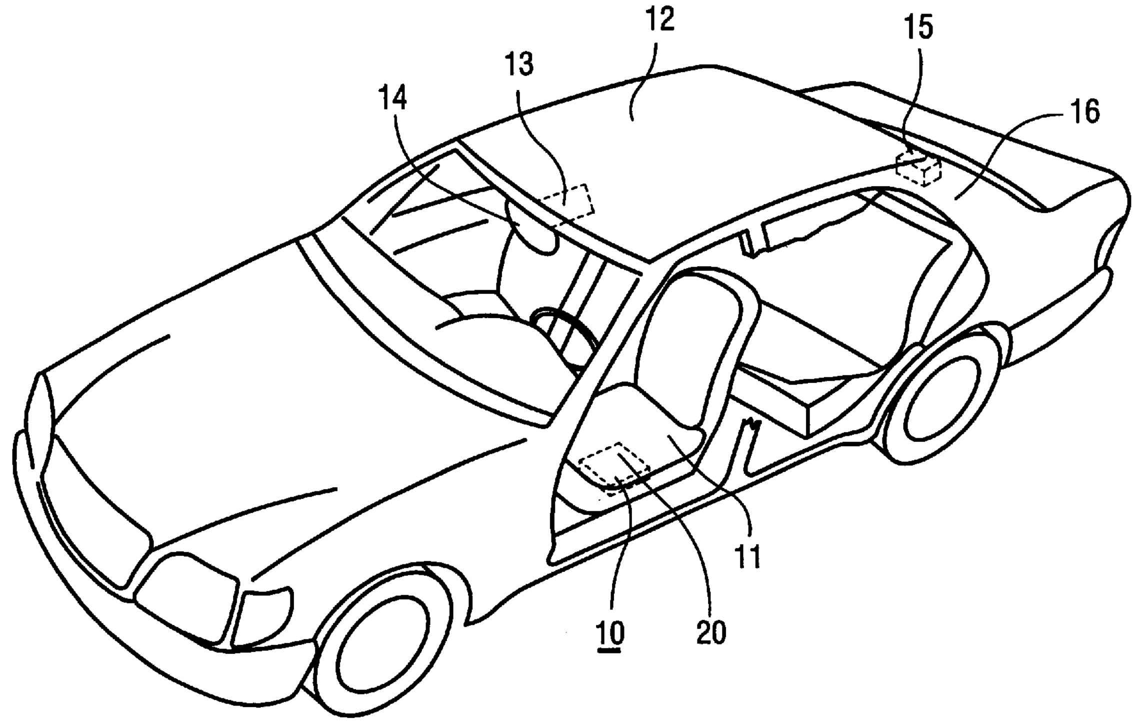
FIG. 1 is a general view of the automotive vehicle with a forward video camera and a rearward video camera which are operationally coupled to the traffic accident data recorder.

DESCRIPTION OF THE PREFERRED EMBODIMENTS (a) Description of FIG. 1

With reference to FIG. 1, the ADVANCED VIDEO BOX (AVB) 10 is mounted horizontally under the driver's seat 11 on an automotive vehicle 12, e.g., a car. A forward-scanning digital video/audio camera 13 is mounted to view forwardly through the rear view mirror 14. The signals, both video and audio, are modulated for transmission via an optical fiber cable (not seen) to the AVB. In addition, a rearward scanning video/audio camera 15 may be mounted on the rear dashboard 16, and the digitized signals therefrom, i.e., video images and audio signals, would similarly be modulated for transmission via an optical fiber cable (not seen), to the AVB. Furthermore, while not seen, still further video/audio cameras may be mounted at the sides of the vehicle and be similarly connected to the AVB 10 to record side collisions. The AVB 10 is housed in a case 20, which is suitably secured, e.g., with screws passing through holes formed in the case to mount the recorder in the automotive vehicle 12. The case 20 needs to have sufficient strength to withstand impact forces when a traffic accident occurs. The AVB 10 further includes a main body and a cover (not seen). The main body has a connector section, e.g., a suitable interface which is later used when connected to an apparatus, e.g., a personal computer, for data analysis, but which is sealed within a cover while the AVB 10 is mounted in the vehicle.

Figure 2:
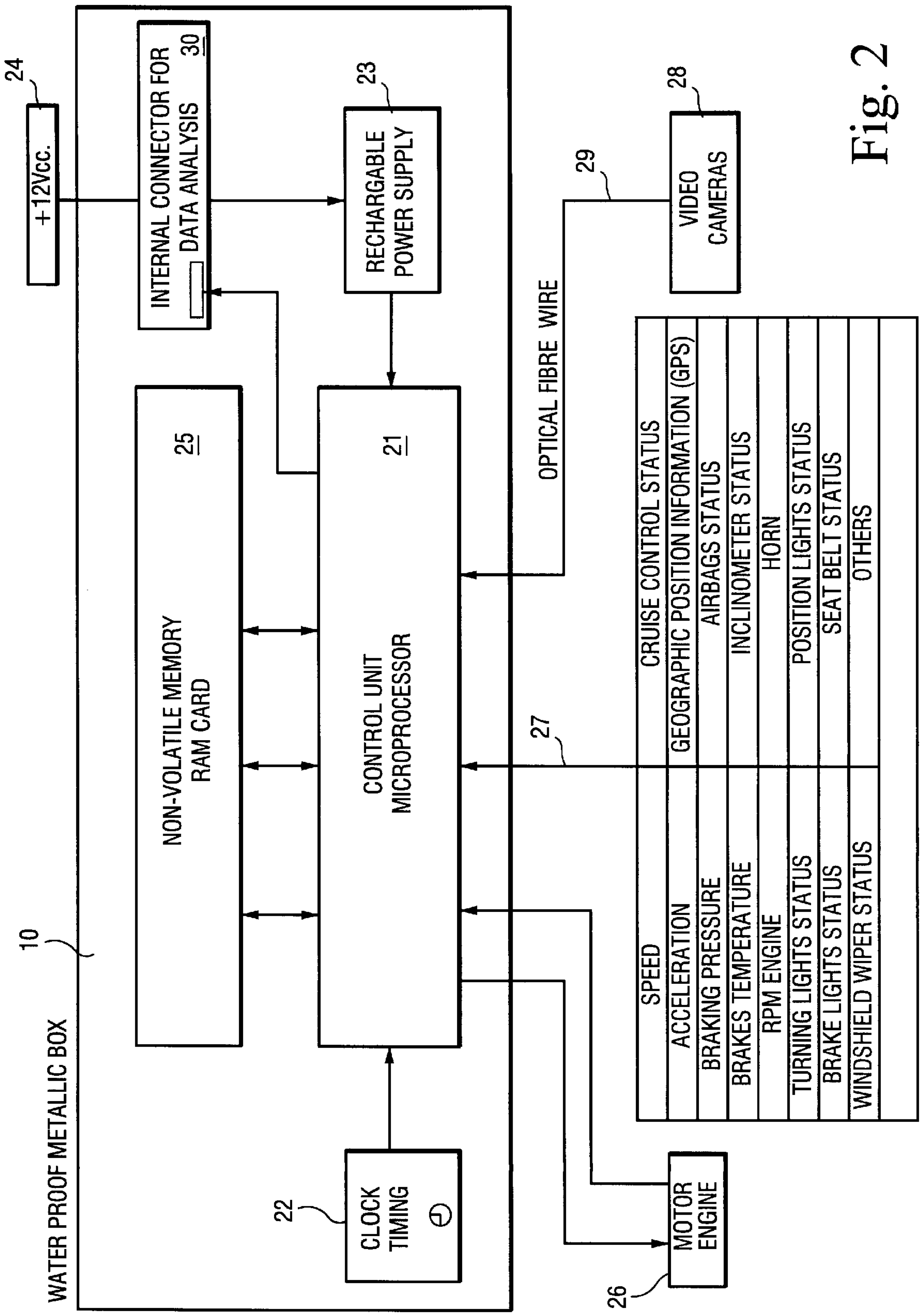
FIG. 2 is a block diagram which schematically shows the traffic accident data recorder, showing the schematic connection of the video camera data input and various examples of operational data inputs by way of a control section.

(ii) Description of FIG. 2

With reference to FIG. 2 of the drawings, the AVB 10 comprises a microprocessor-based control unit 21 clocked by timing clock 22 and powdered by a rechargeable battery power supply 23, which is itself continuously recharged from the car battery 24. The microprocessor 21 stores and updates the desired operational data continuously in a NVRAM (non-volatile random access memory) 25 is for later access and analysis when and if required. The operational data, which include engine data 26, as well as other desired momentary operation statuses of the automotive vehicle, are inputted via a suitable data-bus 27. The microprocessor 21 also receives video images and audio signals from one or more video/audio cameras 28, which signals are modulated for optical transmission via one or more optical fibers 29. Optical transmission is desirable, because it significantly reduces likelihood of electromagnetic interference (EMI) from exogenous or engine-generated origins. The modulated video and audio signals which are digitally encoded signals are stored and updated either continuously or intermittently at regular intervals for, say, the last few minutes in the NVRAM 25. Such signals are also subject to later access and analysis when and if required.

The AVB 10 includes internal connectors 30 for data analysis. These internal connectors include a receiving and transmitting interface for receiving vehicular operational data and for receiving digitized video images and audio signals, and for transmitting those vehicular operational data and for transmitting those digitized video images and audio signals to the rewritable non-volatile memory 25. The AVB 10 also includes a computer interface for coupling to the rewritable non-volatile memory 25 and to an external computer (not seen). That computer interface provides the means for storing the vehicular operational data and the digitized video images and audio signals in a computer-readable form.

In order to analyze the data, the external computer is loaded with a suitable computer program for accessing the operational data, the video images and the audio signals from the computer-readable form which is, e.g., on a RAM card or a disc. The computer program is password protected. When the computer program is executed, the computer analyzes operational data, the digitized video images and the digitized audio signals for reconstructing an accident involving the automotive vehicle. The reconstructed accident can be shown frame-by-frame on the computer monitor and/or may be printed frame-by-frame on a hard copy and/or may be transferred to tape for viewing continuously via a VCR.

CONCLUSION

The AVB of embodiments of the present invention thus provides a system and method of especial applicability to the on-scene recordation and subsequent ex post facto reconstruction of traffic accident scenes by law enforcement officers which is readily and efficient implemented in conjunction with the utilization of variations on existing accident reconstruction procedures.

Thus, if an automotive vehicle which is equipped with the AVB were involved in any accident or another event (for example, crimes committed in an area which is viewed by video cameras) the "competent authority" will be able to obtain a reading of the information registered in the non-volatile memory of the recorder device. This information will become an irrefutable proof of the events occurred, playing a similar role to that of the "black box" with which all the commercial airplanes are quipped.

The AVB will be of an invaluable help for the determination of responsibilities of individuals in all kinds of events, to such an extent that its use should be encouraged and promoted by insurance companies and other public or private institutions responsible for the security of people and their property.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. A system for sensing, storing and updating operational parameters, visual conditions and audible conditions associated with an automotive vehicle, comprising:

(i) a plurality of sensors for registering automotive vehicle operational parameters, including at least one vehicle-mounted digital video/audio camera which is placed inside the rear view mirror;

(ii) microprocessor control means responsive to said vehicle operational parameters which have been registered by said plurality of sensors for processing said operational parameters and video images and audio signals from said digital video/audio camera;

(iii) rewritable non-volatile memory means for storing processed operational parameters, visual images and audio signals which are provided by said microprocessor control means; and (iv) said microprocessor control means updating the rewritable memory as new parameters, visual images and audio signals are sensed.

2. The system as claimed in claim 1, wherein one signal video/audio camera is provided for viewing forwardly and is placed in the rear view mirror to provide a visual image and audio sounds of an oncoming forward path of travel of said automotive vehicle.

3. The system as claimed in claim 1 wherein a video/audio camera is provided for viewing rearwardly to provide a visual image and audio sounds of a previous rearward path of travel of said automotive vehicle.

4. The system as claimed in claim 1 including a video and audio camera is provided for viewing each side of said automotive vehicle.

5. The system as claimed in claim 1, wherein said microprocessor control means and said rewritable non-volatile memory means are housed on a tamper-proof, but removable, box which is fixed to said automotive vehicle.

6. The system as claimed in claim 1, wherein said microprocessor control means continuously updates said rewritable non-volatile memory means.

7. The system as claimed in claim 1, wherein said control means periodically and regularly updates said rewritable non-volatile memory means.

8. The system as claimed in claim 1, wherein said rewritable non-volatile memory means includes multiple logical data pages for storing independent sets of data.

9. The system as claimed in claim 1, wherein said rewritable, non-volatile memory means includes one of: a dynamic RAM with a battery backup and a refresh memory, a static RAM with a battery backup, and an electrically-alterable ROM.

10. The system as claimed in claim 1, wherein said operational parameters of said automotive vehicle are related to events which are internal to said automotive vehicle, and which are selected from at least one of: braking pressure; brake temperature; brake line hydraulic pressure; average speed; acceleration or deceleration in one or more dimensions; rate of turning; steering angle; compass direction of travel; impact; tire pressure; cruise control status; windshield wiper status; fog light status; defroster status; and geographic positioning information.

11. The system as claimed in claim 1, wherein said digitized video images and audio signals are related to events which are external to said automotive vehicle and which are selected from at least one of: the closing rate between said automotive vehicle and an obstacle and/or another automotive vehicle, the distance between said automotive vehicle and an obstacle and/or another automotive vehicle, and the direction of an obstacle and/or another automotive vehicle.

12. The system as claimed in claim 1, wherein the storing of the processed operational parameters, and of said video images and audio signals is commenced upon turning "on" the ignition of the automotive vehicle.

13. The system as claimed in claim 1, wherein the storing of the processed operational parameters, and of said video images and audio signals is terminated upon turning "off" the ignition of the automotive vehicle.

14. The system as claimed in claim 1, wherein the storing of the processed operational parameters is terminated upon turning "off" the ignition, and the storing of the said video images and said audio signals is terminated automatically.

15. The system as claimed in claim 1, including (v) a computer interface for coupling to said rewritable non-volatile memory means and to an external computer which is loaded with an appropriate computer program, said computer interface providing means for storing said vehicular operational data and said digitized video image signals and said audio signals in a computer-readable form; and (vi) analyzing means which are operate upon executing a computer program which has been loaded into said computer for accessing said operational data, said video images and said audio signals, and for enabling said computer to analyze said operational data values, said digitized video images and said audio signals for reconstructing an accident involving said automotive vehicle.

16. A method for recording events relating to an accident involving in automotive vehicle, said method comprising the steps of:

(a) providing a plurality of sensors for registering vehicular operational parameters, including at least one vehicle-mounted digital video/audio camera;

(b) providing a microprocessor control means which is responsive to said vehicle operational parameters which have been registered by said plurality of sensors for processing said operational parameters, said digitized video images and said audio signals from said digital video/audio camera;

(c) providing rewritable non-volatile memory means for storing processed operational parameters, video images and audio signals which are provided by said microprocessor control means;

(d) providing receiving and transmitting interface means for receiving vehicular operational data, and for receiving digitized video images and audio signals, and for transmitting said vehicular operational data, and for transmitting said digitized video images and said audio signals to said rewritable non-volatile memory means;

(e) providing a computer interface adapter for coupling to said rewritable non-volatile memory means;

(f) providing said computer interface adapter with computer interface means for enabling the storing of said vehicular operational data and said digitized video images and said audio signals in a computer-readable form;

(g) coupling said computer interface adapter to a computer which is loaded with an appropriate computer program;

(h) reading, into said computer, said computer-readable automotive vehicle operational data, said video images and said audio signals; and (i) executing said computer program for reconstructing an accident involving said automotive vehicle.

17. The method as claimed in claim 16, wherein said reconstructed accident is displayed on a monitor of said computer, and/or is printed frame-by-frame, and/or is converted to video/audio tape for viewing via a VCR.

18. The method as claimed in claim 16, wherein said computer program is password protected.

* * * * *

UNITED STATES PATENT AND TRADEMARK OFFICE

CERTIFICATE OF CORRECTION

PATENT NO. : 6,246,933 B1

DATED : June 12, 2001

INVENTOR(S) : Vaeza Baque

It is certified that error appears in the above-identified patent and that said Letters Patent is hereby corrected as shown below:

Title page,
Item [76], Inventor, change "Bague" to -- Baque --.

Signed and Sealed this

Twenty-seventh Day of November, 2001

*Attest:*

Nicholas P. Godici

NICHOLAS P. GODICI

*Attesting Officer* *Acting Director of the United States Patent and Trademark Office*